United States Patent
Delaveau et al.

(10) Patent No.: US 9,338,587 B2
(45) Date of Patent: May 10, 2016

(54) SYSTEM AND METHOD FOR RADIO-TAGGING RADIO TRANSMITTERS

(71) Applicant: THALES, Courbevoie (FR)

(72) Inventors: Francois Delaveau, Gennevilliers (FR); Philippe Viravau, Gennevilliers (FR); Patrick Goguillon, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/443,340

(22) PCT Filed: Nov. 14, 2013

(86) PCT No.: PCT/EP2013/073866
§ 371 (c)(1),
(2) Date: May 15, 2015

(87) PCT Pub. No.: WO2014/076201
PCT Pub. Date: May 22, 2014

(65) Prior Publication Data
US 2015/0296327 A1 Oct. 15, 2015

(30) Foreign Application Priority Data
Nov. 16, 2012 (FR) ...................................... 12 03071

(51) Int. Cl.
*H04B 5/00* (2006.01)
*H04W 4/00* (2009.01)
(Continued)

(52) U.S. Cl.
CPC .................. *H04W 4/008* (2013.01); *G01S 7/38* (2013.01); *H04L 9/3228* (2013.01); *H04W 12/06* (2013.01); *H04W 72/0453* (2013.01); *H04L 2209/805* (2013.01); *H04W 12/08* (2013.01)

(58) Field of Classification Search
CPC ..... H04W 12/06; H04W 4/008; H04W 12/08; H04W 72/0453
USPC .......................................................... 455/41.1
See application file for complete search history.

(56) References Cited

U.S. PATENT DOCUMENTS

2010/0246825 A1    9/2010 Baras

FOREIGN PATENT DOCUMENTS

| FR | 2629655 A1 | 10/1989 |
| GB | 1605319 A | 7/1989 |

OTHER PUBLICATIONS

John El Kleider, et al., "Radio Frequency Watermarking for OFDM Wireless Networks", 2004 Proceedings Acoustics, Speech, and Signal Processing, May 17, 2004, pp. 397-400, vol. 5, IEEE, Piscataway, NJ, USA, XP010718949.

(Continued)

*Primary Examiner* — Eugene Yun
(74) *Attorney, Agent, or Firm* — Baker & Hostetler LLP

(57) ABSTRACT

A system and method for radio frequency tagging a transmitter of a useful first signal $S_u$, by a tagging second signal $C_{tag}$, the signals are transmitted simultaneously, comprises at least the following elements: signal generation means adapted: to produce a useful signal $S_u$ in a given frequency band B, at a frequency $f_{Su}$ and an amplitude $A_{Su}$, and to determine, from the values of the band parameter $B_{Su}$ of the useful signal $S_u$ and from the amplitude $A_{Su}$ of the useful signal $S_u$, the parameters of the tagging signal $C_{tag}$, a transmission antenna adapted to simultaneously transmit said signal $S_u$ and said tagging signal, the level of which is X dB lower than the useful signal $S_u$, means for receiving and processing the useful signal and the tagging signal adapted to discriminate the tagging signal from the useful signal.

17 Claims, 4 Drawing Sheets

(51) Int. Cl.
*G01S 7/38* (2006.01)
*H04W 12/06* (2009.01)
*H04L 9/32* (2006.01)
*H04W 72/04* (2009.01)
*H04W 12/08* (2009.01)

(56) References Cited

OTHER PUBLICATIONS

Dilip V. Sarwate et al., "Crosscorrelation Properties of Pseudorandom and Related Sequences," Proceedings of the IEEE, vol. 68, No. 5, May 1980, pp. 593-619.

PROCESSING OUTPUT
SNR'($S_u$) = unchanged
SNR'($C_{tag}$) = 32 dB
SINR'($C_{tag}$) ≥ 22 dB

SYSTEM AND METHOD FOR RADIO-TAGGING RADIO TRANSMITTERS

CROSS-REFERENCE TO RELATED APPLICATIONS

This application is a National Stage of International patent application PCT/EP2013/073866, filed on Nov. 14, 2013, which claims priority to foreign French patent application No. FR 1203071, filed on Nov. 16, 2012, the disclosures of which are incorporated by reference in their entirety.

FIELD OF THE INVENTION

The subject of the invention relates to a system and a method for radio frequency tagging radio frequency transmitters by means of a secondary signal transmitted simultaneously on the same frequency and accompanying a main signal, this secondary signal being recognizable only by authorized third parties.

The invention applies to all types of transmitters; communication network infrastructures; terminals; propagation channel sounders; third party transmission systems employed for controlling communications generating or not generating interferences; etc., the main signals of which are, in the context of the implementation of the invention, accompanied by a tagging secondary signal exhibiting characteristics making it possible to unambiguously identify the transmitter.

BACKGROUND

In radio frequency systems and platforms supporting transmission/reception systems, it is known practice to use a system for identifying a friendly or authorized user on specific frequencies (principle of friend-foe interrogators IFF, which stands for "Identification Friend and Foe"). A transponder of this type produces an external tagging in that it responds to an interrogation recognized as originating from an authorized user, by returning a response in the form of a signal coded specifically for said authorized receivers.

In these systems, the major drawbacks lie in the fact that the frequency plans supporting the interrogation/response interchanges are fixed and known, and in that the signals can be fairly easily detected and analyzed by third party receivers. For example, the IFF transponders, even in their protected versions (mode S or mode 5 known to those skilled in the art), receive the interrogation on a known and standardized frequency (1030 MHz), and respond on a frequency that is also known and standardized (1090 MHz). The 1030 and 1090 MHz frequencies can thus be easily surveyed, analyzed, even disrupted by third parties (interferences).

Also, it is necessary to have transmitter systems specific to the identification, operating in bands that are also specific and generally very different from the useful signal transmission bands, hence an increase in indiscretion, an increased vulnerability to third parties, an increase in the number of hardware components, increased risks for electromagnetic compatibility, etc.

Regarding the modern digital radio communication networks, it is also known practice to include frame words, synchronization sequences and pilot signals in the forms of FDMA (Frequency Division Multiple Access), TDMA (Time Division Multiple Access), CDMA (Code Division Multiple Access) waves or in the OFDM (Orthogonal Frequency Division Multiplexing) coding modulations which enable a user to detect the host networks and be synchronized on infrastructure transmitters, on relay terminals or on communication nodes. The tagging of the transmitter is produced by the inclusion of these words, sequences or pilot signals, and by coded messages in the broadcast signaling to which the detection of these words, sequences or pilot signals gives access. This tagging is then internal to the useful signal.

The systems and methods known from this prior art notably have the drawback of requiring wave forms and access protocols that are complex, and all the more complex when protection is sought for these words, sequences, pilot signals and signaling messages with respect to unauthorized third parties. These methods therefore apply only to certain restricted categories of transmission systems (typically communication infrastructures and nodes in the digital networks). Furthermore, they consume a significant share of the radio frequency resource allotted for the transmissions and for the overall operation of the networks which implement them, at the expense of the capacity of the transmitters and of the network. Finally, when the words, sequences, pilot signals and signaling messages have to be protected with respect to unauthorized third parties, the wave forms and corresponding access protocols are made much more complex.

The patent application U.S. 2010/0246825 corresponds to a technique (well known) for authenticating transmitted messages as used in the modern cryptographic and integrity control methods.

The patent application FR 2 629 655 A1 relates to the effective friend-foe identification and describes a system using an identification signal which has a level lower than the other signals.

The document by KLEIDER J E ET AL: "Radio frequency watermarking for OFDM wireless networks", frequency watermarking for OFDM wireless networks", ACOUSTICS, SPEECH, AND SIGNAL PROCESSING, 2004. PROCEEDINGS. (ICASSP '04). IEEE, H04L9/32 INTERNATIONAL CONFERENCE ON MONTREAL, QUEBEC, CANADA MAY 17-21, 2004, PISCATAWAY, N.J., USA, IEEE, PISCATAWAY, N.J., USA, H04H60/35 vol. 5, May 17, 2004 (05-17-2004), pages H04B1/59397-400, XP010718949, discloses a Radio Watermarking method.

For the rest of the description, the following concepts are defined:
- a useful signal, hereinafter denoted $S_u$, is a main radio frequency signal originating from a transmitter of any type (infrastructure or node of a communication network; terminal; channel sounders; transmission systems used for controlling communications in a network, generating or not generating interferences; etc.); thus, in the context of the invention, an interference signal will be able to be considered as a useful signal and denoted $S_u$.
- a tag signal or tagging signal, hereinafter denoted $C_{tag}$, is a secondary signal transmitted at the same time and on the same frequency bands as the useful signal, but generally with lower levels, and which exhibits parameterizations and/or which contains information that can be recognized by authorized users for the purposes of identification of the transmitter of the useful signal by authorized third parties.

SUMMARY OF THE INVENTION

The method and the system according to the invention rely notably on the use of a radio frequency tagging signal, constructed to be able to be detected only by authorized users, the transmission of this tagging signal being performed at lower power than the useful signal but concomitantly, in order for said tagging signal to be (deliberately) interfered with "at source" by the useful signal. Only receivers that are authorized and informed of the characteristics of the tagging signal are capable of detecting, of recognizing and of interpreting it in the mix of the signals received $S_u+C_{tag}$.

The invention relates to a system for radio frequency tagging a transmitter of a useful first signal $S_u$, by a tagging second signal $C_{tag}$ comprising parameterizable time and frequency characteristics, said tagging signal is transmitted simultaneously accompanying the useful signal $S_u$, said transmitter operating in a system comprising a number of users authorized and adapted to recognize the tagging signal, through specific processing operations, said system comprising at least the following elements:

signal generation means:
  adapted to produce a useful signal $S_u$ in a given frequency band B, at a frequency $f_{Su}$, and an amplitude $A_{Su}$, and
  knowing at least the values of the band parameter $B_{Su}$ of the useful signal $S_u$ and of the amplitude $A_{Su}$ of the useful signal $S_u$, adapted to determine, from said values, the parameters of the tagging signal $C_{tag}$ such as:
    the carrier of the tagging signal $C_{tag}$,
    the band $B_{Ctag}$ of the tagging signal,
    the amplitude $A_{Ctag}$ of the tagging signal with a signal level X dB lower than the useful signal $X=A_{Ctag}/A_{Su}$,
    the time characteristics of the tagging signal $C_{tag}$, such as
      its modulation characteristics: constellation, rate $R_{Ctag}$, possible filtering in transmission,
      its duration and its repetition period, $T_{Ctag}$,
      the description of its construction over a period $T_{Ctag}$
a transmission antenna adapted to simultaneously transmit said signal $S_u$ and said tagging signal, the level of which is X dB lower than the useful signal $S_u$, means for receiving and processing the useful signal and the tagging signal adapted to detect and to discriminate the tagging signal from the useful signal.

The system is, for example, a communication network, a sounding signal generation network, or an interfering signal generation network.

The description of the precise construction of the tagging signal over a period $T_{Ctag}$ allows regeneration in authorized receivers for the purposes of their processing operations.

The system can also have a preliminary base band storage of the tagging signal $C_{tag}$ over a repetition period $T_{Ctag}$, intended to allow rereading thereof in authorized receivers for the purposes of their processing operations.

The signal generation means comprise, for example:
a first generator adapted to produce said useful signal $S_u$ in a given frequency band $B_{Su}$, at a frequency $f_{Su}$ and an amplitude $A_{Su}$, this first generator analog or digital, for example,
a second analog or digital generator knowing at least the values of the band parameter $B_{Su}$ of the useful signal $S_u$ and of the amplitude $A_{Su}$ of the useful signal $S_u$, adapted to determine, from said values, the parameters of the tagging signal $C_{tag}$, or:
  the carrier of $C_{tag}$,
  the band $B_{Ctag}$ of $C_{tag}$,
  the amplitude $A_{Ctag}$ of $C_{tag}$,
  the time characteristics of the tagging signal such as a modulation rate (denoted $R_{Ctag}$), a repetition period, denoted $T_{Ctag}$,
  the description of its precise construction over a period $T_{Ctag}$ in order to allow regeneration in authorized receivers for the purposes of their processing operations, a store/forward system or a digital exciter, receiving the useful signal $S_u$ and the tagging signal $C_{tag}$ and adapted to forward said signals by controlling the amplitudes and the synchronisms thereof.

The system can also have a preliminary base band storage of the tagging signal $C_{tag}$ over a repetition period $T_{Ctag}$, intended to allow rereading in authorized receivers for the purposes of their processing operations.

The useful signal and tagging signal generation and transmission means are, for example, adapted to produce:
a base band signal,
a resultant signal at the instant t, $S(t)=S_u(t)+(A_{Ctag}/A_{Su}) \cdot C_{tag}(t)$, said resultant signal $S(t)$ being obtained by the addition of the base band signals $S_u(t)$ and $C_{tag}(t)$ at the output of the two generators, by observing the ratio of the amplitudes $X=A_{Su}/A_{Ctag}$ by the application of the weighting $X=A_{Ctag}/A_{Su}$ to the tagging signal $C_{tag}(t)$, then
to transpose onto a carrier $f_0$ and to amplify by a factor $A_{Su}$ the signal $S(t)$ resulting from the mixing, in order to generate, as output, the amplified total analog signal on carrier $S_{Carrier}(t)=[A_{Su} \cdot S_u(t)+(A_{Ctag}) \cdot C_{tag}(t)] \cdot \cos(2\pi f_0 t)$.

The signal generation means are, for example, composed of a single digital generator with programmable memory and of a signal transposition and amplification digital-analog conversion stage,
  said digital generator is adapted to be used sequentially in order to generate the useful signal $S_u$ then the tagging signal $C_{tag}$,
  said digital generator has a programmable memory,
  and said digital generator is adapted:
    to generate the tagging signal $C_{tag}(k \cdot T_E)$ and the useful signal $S_u(k \cdot T_E)$ in base band at the sampling instants $t=k \cdot T_E$ with $T_E$: the sampling period, k: the time index of the sample k, observing the weighting $X=A_{Ctag}/A_{Su}$ on the sampled tagging signal $C_{tag}(k \cdot T_E)$, then,
    to generate, in sampled form, the resultant mix $S(k \cdot T_E)=S_u(k \cdot T_E)+(A_{Ctag}/A_{Su}) \cdot C_{tag}(k \cdot T_E)$ in base band at the sampling instants $t=k \cdot T_E$,
  said transposition and amplification digital-analog conversion stage is adapted to generate the total analog signal on carrier at the output $S_{Carrier}(t)=[A_{Su} \cdot S_u(t)+(A_{Ctag}) \cdot C_{tag}(t)] \cdot \cos(2\pi f_0 t)$ using the digital-analog conversion transforming $S(k \cdot T_E)$ into $S(t)$, the transposition onto carrier $f_0$, and the amplification by a factor $A_{Su}$.

The value of X is at least equal to −10 dB, and preferably varies from −20 dB to −50 dB.

According to a variant embodiment, the device for generating the signal $C_{tag}$ comprises a means adapted to generate pseudo-random codes PN, of parameterizable level, period and composition, to form the tagging signal, said composition is obtained by using one of the following methods: totally arbitrary, by simulations or by computations, by shift registers or by combinations between shift registers.

The system can comprise a generator of binary sequences chosen from the following list: binary sequences of maximum length, Gold or Gold-type sequences, dual-BCH sequences, simple or extended Kasami sequences, Mac Eliece sequences, Barker codes, or any other type of pseudo-random sequence generated by algebraic methods.

The reception means can comprise a database comprising characteristics of codes used for the generation of the tagging signal $C_{tag}$.

The invention relates to a transmission-reception system in which the reception means are informed reception means, comprising a database made up of the complete characteristics and of the composition of the codes used for the generation of the tagging signal $C_{tag}$.

The invention relates also to a method
for radio frequency tagging a transmitter of a useful first signal $S_u$, by a tagging second signal $C_{tag}$ comprising parameterizable time and frequency characteristics,
said tagging signal is transmitted simultaneously accompanying the useful signal $S_u$,
said transmitter operating in a system comprising a number of users authorized and adapted to recognize the tagging signal, through specific processing operations, characterized in that it comprises at least the following steps:
producing a useful signal $S_u$ in a given frequency band B, at a frequency $f_{Su}$ and an amplitude $A_{Su}$, and
knowing at least the values of the band parameter $B_{Su}$ of the useful signal $S_u$ and of the amplitude $A_{Su}$ of the useful signal $S_u$, determining, from said values, the parameters of the tagging signal $C_{tag}$:
the carrier of $C_{tag}$,
the band $B_{Ctag}$ of $C_{tag}$,
the amplitude $A_{Ctag}$ of $C_{tag}$ with a signal level X dB lower than the useful signal $X = A_{Ctag}/A_{Su}$,
the time characteristics of $C_{tag}$, such as
its modulation characteristics: constellation, rate $R_{Ctag}$, possible filtering in transmission,
its duration and its repetition period, $T_{Ctag}$,
the description of its construction over a period $T_{Ctag}$ adapted to allow regeneration in authorized receivers for the purposes of their processing operations,
to simultaneously transmit said signal $S_u$ and said tagging signal, the level of which is X dB lower than the useful signal $S_u$,
to discriminate, at the signal reception level, the tagging signal from the useful signal from the useful signal.

The method is, for example, implemented in a communication network, a sounding signal generation network, or an interfering signal generation network.

The method can also have preliminary base band storage of the tagging signal $C_{tag}$ over a repetition period $T_{Ctag}$, intended to allow rereading thereof in authorized receivers for the purposes of their processing operations.

For the implementation of the method, it is possible to use distinct generation means to produce the useful signal $S_u$ and the tagging signal $C_{tag}$.

According to a variant implementation of the method, a resultant signal is generated at the instant t $S(t) = S_u(t) + (A_{Ctag}/A_{Su}) \cdot C_{tag}(t)$ that is transposed onto a carrier $f_0$ and that is amplified by a factor $A_{Su}$, to obtain a signal on carrier amplified at the output $S_{Carrier}(t) = [A_{Su} \cdot S_u(t) + (A_{Ctag}) \cdot C_{tag}(t)] \cdot \cos(2\pi f_0 t)$, said resultant signal $S(t)$ being obtained by the addition of the base band signals at the output of two analog or digital generators, by observing the amplitudes $A_{Su}$ and $A_{Ctag}$ by the application of a weighting $X = A_{Ctag}/A_{Su}$ to the tagging signal in the resultant signal.

The value of X is chosen, for example, to be at least equal to −10 dB, and preferably varying from −20 dB to −50 dB.

When the method is executed, pseudo-random codes PN are generated, of parameterizable level, period and composition, to form the tagging signal.

According to a variant, characteristics of codes stored in a database are used in order to discriminate, at the signal reception level, the tagging signal $C_{tag}$ from the useful signal.

During the execution of the method, the following are, for example, used:

informed reception means, comprising a database made up of the complete characteristics and of the composition of the codes used for the generation of the tagging signal $C_{tag}$, and
detection techniques of a type oriented on the characteristics of the signal, based on the use of cyclical self-correlation, first and second moments, the estimation of the first moment being restricted to the range of the cyclical frequencies close to the modulation rate of the signal $C_{tag}$ restricted to the ranges of the delays close to 0 and close to the repetition period T of the signal $C_{tag}$, the estimation of the second moment being restricted to the range of the cyclical frequencies close to the modulation rate increased by twice the carrier frequency.
detection techniques of informed type, based on filtering adapted to the tagging signal $C_{tag}$, time or space-time filtering if the informed receiver has an array of receiving antennas of theoretically optimal performance levels.

BRIEF DESCRIPTION OF THE DRAWINGS

Other features and advantages of the present invention will become more apparent on reading the following description of an exemplary embodiment given as an illustrative and nonlimiting example, with figures attached which represent.

DETAILED DESCRIPTION

Figure 1:
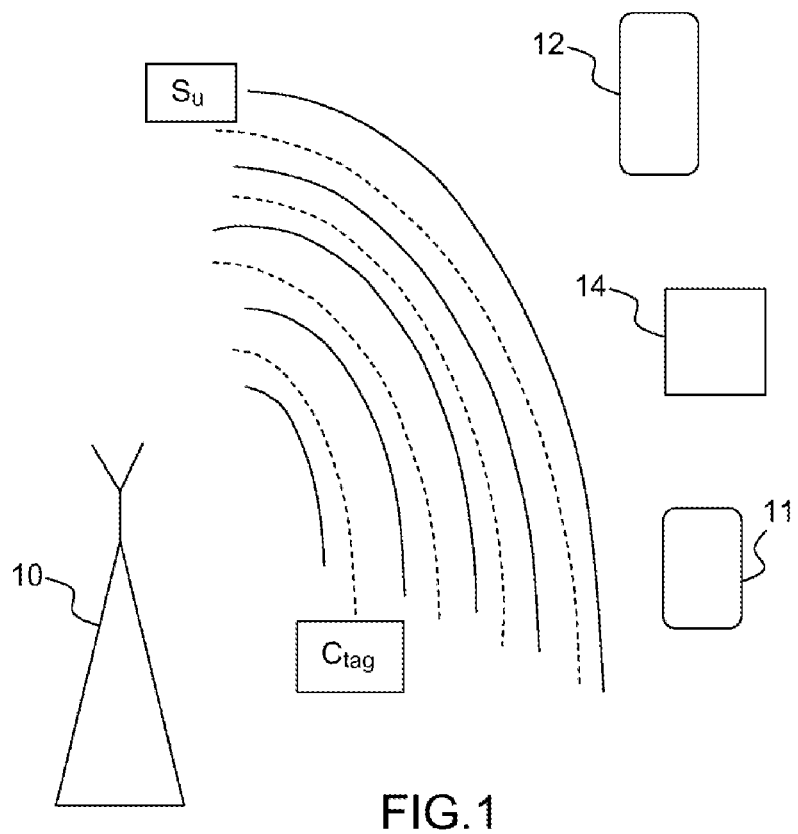
FIG. 1, a general diagram of the system according to the invention,
FIG. 2, an exemplary transmission system and reception system according to the invention,
FIG. 3, an example of spectral representation in a processing band equal to the band of the tag signal $B_{Ctag} = 20$ MHz of a mix in reception made up of a useful signal $S_u$ (envelope I) and of a tagging signal $C_{tag}$ (curve II) of PN/DSSS type on band B of known sequence with a period of approximately 32 768 chips,
FIG. 4, an example of spectral representation of the output from the processing in reception allowing for the detection and the recognition (in the form of a peak) of the tagging signal $C_{tag}$, with a signal-to-noise+interference ratio at the output above a certain margin η relative to a noise floor, and
FIG. 5, an example of curves of probability of detection and of false alarm for a tagging signal at processing output, according to the value of the signal-to-noise+interference ratio at the output SINR' ($C_{tag}$).

FIG. 1 describes an exemplary implementation of the system according to the invention for radio frequency tagging a transmitter of a useful signal Su by a tagging second signal Ctag the time and frequency characteristics of which are parameterizable, according to the applications. The system according to the invention operates in a communication system or network comprising a number of users.

Figure 2:
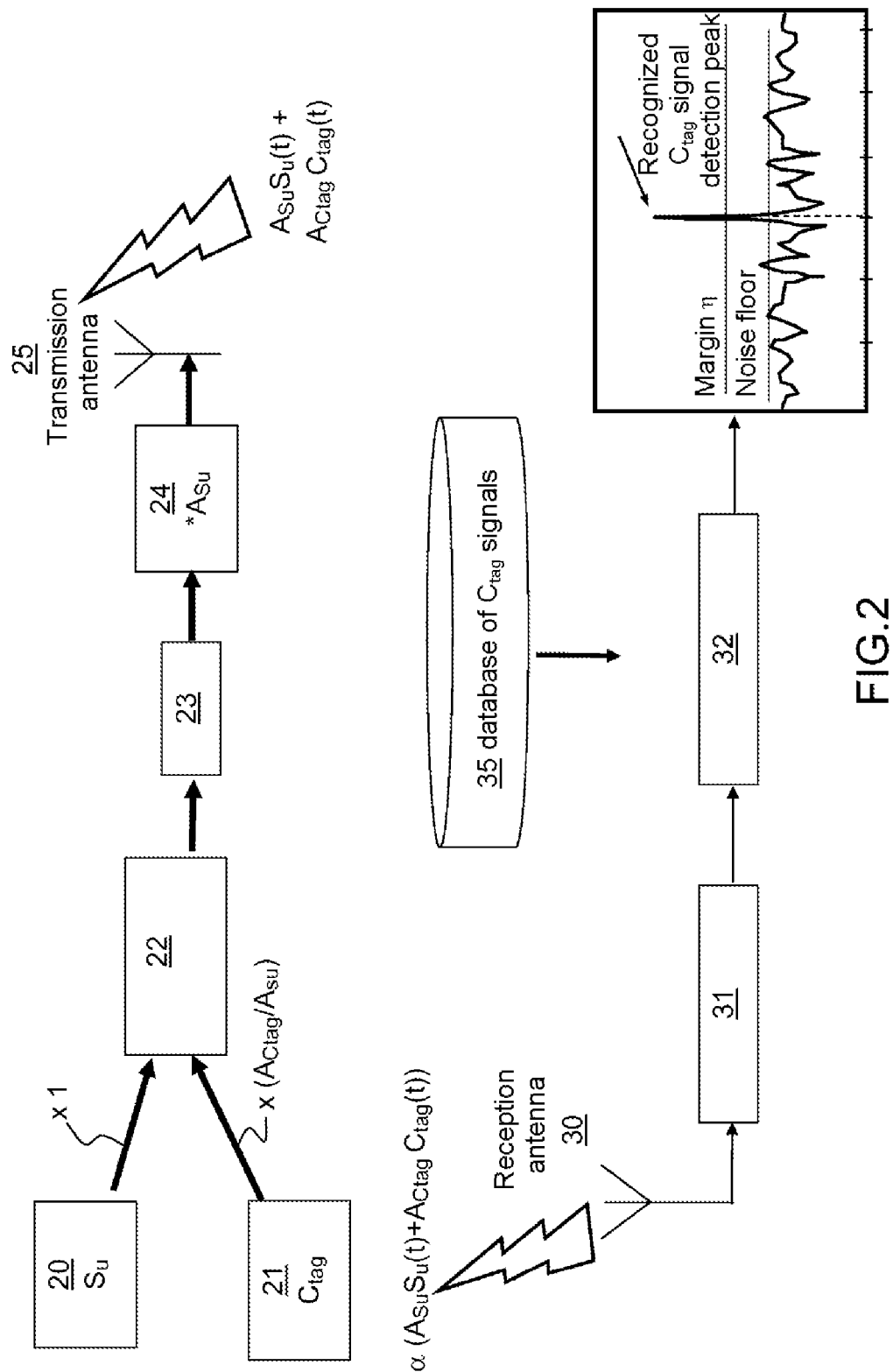

A transmission device 10 detailed in FIG. 2 transmits a mix of signals made up of a useful signal $S_u$ and of a tagging signal $C_{tag}$. The tagging signal $C_{tag}$, transmitted at the same time as the useful signal $S_u$ in the same band, on the same carrier and at a lower power, is structured specifically and comprises parameters detailed hereinbelow allowing an authorized user to detect it and to recognize it unambiguously (see FIG. 4), even when it is greatly interfered with by the useful signal $S_u$ (see FIG. 3). On reception, the authorized receivers 11, 12 on the signal $C_{tag}$ comprise means described hereinbelow adapted to detect, in the mix made up of the useful signal and of the tagging signal, recognize, and if necessary decode the tag signal $C_{tag}$, whereas the unauthorize receivers 14 will see only the dominant useful signal $S_u$, without in any way being able to detect the presence of the secondary signal $C_{tag}$, and even less recognize it or decode/decrypt it.

FIG. 2 schematically represents an exemplary device adapted to simultaneously transmit the useful signal $S_u$ and the signal $C_{tag}$. In this example, the means for generating the useful signal and those for generating the tagging signal are separate.

A first digital generator 20 is adapted to produce a useful signal $S_u$ in a given frequency band B, at a frequency and an amplitude $A_{Su}$. The first generator can be analog or digital.

A second digital generator 21, knowing the values of the band parameter $B_{Su}$ of the useful signal and of the amplitude $A_{Su}$ of the useful signal $S_u$, will determine, from these values, the parameters of the tagging signal $C_{tag}$. The second generator can be analog or digital. The parameterizing of the tag signal in normal operation is a function of the characteristics of the transmitter, power, band, carrier, and of desired protection level. The tag signal is, a priori, heterogeneous with the useful signal, it does not exhibit the same periods, or the recurrences, not the same coding, not the same modulation.

In practice:
the carrier of $C_{tag}$ is, in most applications, close or identical to that of the useful signal,
the band $B_{Ctag}$ of the tagging signal is, in most applications, slightly below or identical to that of the useful signal $B_{Su}$,
the other main parameters of the signal $C_{tag}$ are, notably:
its amplitude $A_{Ctag}$,
its time characteristics affecting the processing of the authorized receivers, such as a modulation rate (denoted $R_{Ctag}$), a repetition period, denoted $T_{Ctag}$,
its structure and its precise composition, detailed hereinbelow in the description.

There is an interdependency between the values of the different parameters, $A_{Su}$, $A_{Ctag}$, $B_{Ctag}$ and $T_{Ctag}$, according to the protection levels sought on the signal $C_{tag}$ and according to the algorithmic complexity targeted for the authorized receivers. For example, the choice of the parameters $A_{Ctag}$ and $T_{Ctag}$ of the tagging signal can be set by the following formulations:

the level of the amplitude $A_{Ctag}$ of the tagging signal is set by a constraint of the type $20 \cdot \log_{10}(A_{Ctag}) = 20 \cdot \log_{10}(A_{Su}) - X$ dB, the protection level value X being determined according to the applications and corresponds to the level of interference induced by the useful signal Su on the tagging signal ($SIR(C_{tag}) = -X$), therefore to the protection of the tagging signal by the useful signal $S_u$.

the characteristic period $T_{Ctag}$ is indexed on the protection level X, on the band of the tagging signal and on a margin $\eta$ relative to the noise floor for the detection, to allow a coherent integration in the reception processing. The value of the period is then defined by $10 \log_{10} T_{Ctag} = X + \eta - 10 \log_{10} B_{Ctag}$. The margin $\eta$ is approximately set in the example of FIG. 4 to the "conventional" value $\eta \approx 10$ dB.

The signal $C_{tag}$ is, for example, a signal made up of pseudo-random codes PN repeated with a period $T_{tag}$ distinct from the periods of the useful signal or from their multiples, and modulated on two phase states (BPSK), with, generally, little filtering of the modulation (to assist in the detection by the authorized receivers), a modulation rate less than or equal to the band of the useful signal, on a carrier in the band of the useful signal, in order for the spectrum of $C_{tag}$ to remain included in the band $B_{Su}$ of the modulated useful signal on carrier and for it to be well interfered with "at source" by $S_u$ (and therefore protected with respect to unauthorized third parties).

The digital generators are adapted to generate pseudo-random codes PN, of parameterizable, or totally arbitrary, level, period and composition, either obtained by simulations or by computation, or obtained by shift registers or by combinations between shift registers.

The signal $C_{tag}$ is made up, for example, of binary sequences with optimal or quasi-optimal correlation, such as, for example, sequences known to those skilled in the art (see the article by MM. Sarwate and Pursley: Cross correlation Properties of Pseudorandom and Related Sequences" Proc. IEEE, vol. 68, pp. 593-619, May 1980):

SBLM(P): binary sequences of maximum length generated by a primitive polynomial P,
G(P,Q): Gold sequences generated by two primitive polynomials P and Q,
GL(P,Q): "Gold-like" sequences generated by two primitive polynomials P and Q,
D-BCH: "dual-BCH" sequences generated by two primitive polynomials P and Q,
KS(P,Q): simple kasami sequences generated by two primitive polynomials P and Q,
KE(P,Q): extended kasami sequences generated by two primitive polynomials P and Q,
MCE: Mc Eliece sequence
BA: Barker codes
etc.

One of the essential points lies in the composition of the tagging signals, in their combinatorics and in the quality of their correlations to allow a one-to-one and unambiguous relationship between the composition of the signal $C_{tag}$ and the identity of the transmitter. The abovementioned pseudo-random binary sequences offer, a priori, the best theoretical compromises from this point of view.

It is also possible to use completely random arbitrary sequences with good correlation properties, generated in large numbers by simulation, or known to those skilled in the art.

The information obtained from the first digital generator 20 and from the second digital generator 21 is transmitted to a digital exciter 22. At the output 22s of this digital exciter, the signal $S_u$ and the tag signal $C_{tag}$ are transmitted to an analog-digital convertor 23 then to a local oscillator 24, the output 24s of which is linked to a transmission antenna 25. The transmission antenna will therefore simultaneously transmit a signal $S_u$ and a tagging signal, the level of which is X dB lower than the useful signal $S_u$. In practice, this transmission of the simultaneous mix of signals $S_u$ and $C_{tag}$ can be performed in a number of ways, which will be explained below, in an illustrative and nonlimiting manner.

In a digital generation and transmission chain, the transmission of the simultaneous mix is, for example, performed as follows: by addition of the signal samples I/Q (in phase and in phase quadrature) at the output of the two digital generators 20 and 21, by observing the amplitudes $A_{Su}$ and $A_{Ctag}$ by the application of a weighting $A_{Ctag}/A_{Su}$ to the tagging signal, to produce a resultant signal at the instant t: $S(t) = S_u(t) + (A_{Ctag}/A_{Su}) \cdot C_{tag}(t)$ transposed and amplified by a factor $A_{Ctag}$ to be transmitted at the output of the transmission chain on the carrier $f_0$. In addition to the usual programming and control facilities specific to the digital generation systems, one practical advantage of this type of chain is of employing sequentially, with reduced latencies and an adapted memory management, the same digital signal generator to produce both $C_{tag}(t)$ and $S_u(t)$ in base band and at the sampling instants $t = k \cdot T_E$ ($T_E$: sampling period, k: time index of the sample k), then the mix $S(t)=S_u(t)+(A_{Ctag}/A_{Su}) \cdot C_{tag}(t)$ in base band at the sampling instants $t = k \cdot T_E$. The mix is then directly injected into the digital exciter which performs the analog-digital conversion of the mix, then sends the resultant analog signal into the chain of transposition, 23, +amplification, 24, of the factor $A_{Su}$+transmission antenna 25, which performs the amplified and on-carrier transmission thereof.

According to other variant embodiments and according to the capabilities offered by its components and its architecture, it is possible, for example:

- to add, by means of a suitable mixer, the signals $S_u$ and $C_{tag}$ obtained from two distinct parallel digital generations in base band and two separate parallel digital-analog conversions with an amplitude ratio $A_{Ctag}/A_{Su}$, then inject the mix into the chain of transposition+amplification (by a factor $A_{Su}$)+transmission antenna, or
- to add, by means of a suitable mixer, the signals $S_u$ and $C_{tag}$ obtained from two distinct parallel analog generations in base band with an amplitude ratio $A_{Ctag}/A_{Su}$, then inject the mix into the chain of transposition+amplification (by a factor $A_{Su}$)+transmission antenna, or
- to add, by means of a suitable mixer, the signals $S_u$ and $C_{tag}$ obtained from distinct parallel analog generation+transposition chains with an amplitude ratio $A_{Ctag}/A_{Su}$, then inject the mix into the chain of amplification (by a factor $A_{Su}$)+transmission antenna, or
- to add, by means of a suitable mixer, the signal $S_u$ obtained from an analog generation+transposition+amplification chain at the amplitude $A_{Su}$, and the signal $C_{tag}$ obtained from a distinct second analog generation+transposition+amplification chain at the amplitude $A_{Ctag}$, then inject the mix of the amplified signals $A_{Su} \cdot C_{Su}(t) + A_{Ctag} \cdot Ctag(t)$ into the transmission antenna.

In the embodiments explained previously for the tagging of the signal, the processing of the signals at the reception level is similar. For this, an authorized receiver comprises, for example, a reception antenna 30 receiving the signal $S_u$ and the signal $C_{tag}$ which arrive at the same time with, when they are decorrelated, a power ratio equal to $(A_{Su}/A_{Ctag})^2$. The reception antenna 30 is linked to a processing device comprising filtering means 31 and processing means 32 adapted to notably:

- transpose the mix of the signals into base band,
- detect the tagging signal $C_{tag}$ despite the degree of interference "at source" generated by the useful signal $S_u$,
- recognize and estimate the discriminating characteristics of the signal $C_{tag}$ to unambiguously identify the transmitter. These discriminating characteristics are primarily the composition of the PN codes which constitute the signal $C_{tag}$ and possibly the data which can be coded therein in messages conveyed by the signal $C_{tag}$.

The system can comprise a means for preliminary storage in base band of the tagging signal $C_{tag}$ over a repetition period $T_{Ctag}$, intended to allow rereading in authorized receivers for the purposes of their processing operations.

The recognition and the estimation of the discriminating characteristics can be performed by means of statistical estimation and digital filtering techniques adapted to the tagging signal $C_{tag}$ and exploiting the information available on the latter, techniques that are well known to those skilled in the art.

In practice, the choice of the type of receiver depends on the precise nature of the tagging signal $C_{tag}$ on the one hand and on the information available on the authorized receiver on the other hand. Examples are given hereinbelow in an indicative and nonlimiting manner for a signal $C_{tag}$ made up of binary PN sequences modulated on two phase states:

Case (I1): the information of the authorized receiver is partial if the latter, even without having the perfect knowledge of the structure and of the modulation of the signal $C_{tag}$, knows at least the minimum period, the carrier and the rate thereof. In this case, the detection algorithm used is of the type oriented on the characteristics of the signal, and preferentially based on the use of the cyclical self-correlation (first and second moments), the estimation of the first moment being restricted to the range of the cyclical frequencies close to the modulation rate of the signal $C_{tag}$ and restricted to the ranges of the delays close to 0 and close to the repetition period T of the signal $C_{tag}$, the estimation of the second moment being restricted to the range of the cyclical frequencies close to the modulation rate increased by twice the carrier frequency.

Case (I2): the information of the authorized and informed receiver is complete if the latter has a perfect knowledge of the structure, of the composition and of the modulation of the signal $C_{tag}$. In this case, the detection algorithm used is of "informed of the signal sequences" type and, preferentially, the filter applied is a time-adapted filter (or space-time adapted filter if the authorized receiver has a reception antenna array) to the signal $C_{tag}$, the theoretical performance levels of which are optimal.

The detection device on the authorized receiver, and, if appropriate, the informed receiver, also comprises an up-to-date database 35 comprising different PN codes corresponding to the signals $C_{tag}$ likely to be transmitted as tag signal. The description in the database relates at least to the characteristics of rate, of periodicity and of repetition to orient the processing of the authorized receiver according to methods such as those described above (case (I1)), and, if appropriate, to the precise composition of the signal $C_{tag}$, to regenerate it on the informed receiver in order to apply the abovementioned time-adapted or space-time-adapted filtering (case (I2)).

In the context of the invention, it is therefore possible to also introduce different degrees of information of the authorized receivers, and implant an algorithmic structure with progressive processing operations to limit the complexity of the receivers; for example:

- first detect the presence of a tagging signal via the detection of rates $R_{Ctag}$, periods $T_{Ctag}$ of repetition and carriers inventoried in the database, of type (I1);
- then precisely recognize the composition of the PN code forming the tagging signal in order to unambiguously identify the transmitter by virtue of the great combinatorics of the available PN codes (which allows a one-to-one and unambiguous relationship between the composition of the signal $C_{tag}$ and the identity of the transmitter), by an approach of the type (I2).

The relative transmission level $-X$ (in dB) (protection level) of the tagging signal $C_{tag}$ relative to the useful signal $S_u$ is for example at least $-10$ dB, and preferably from $-20$ dB to $-50$ dB.

At the input of the reception processing, the value of the ratio of the amplitude of the tagging signal $C_{tag}$ relative to the amplitude of the useful signal $S_u$ and to that of reception noise, is $$SINR(C_{tag}) = 20 \cdot \log_{10}(A_{Ctag}/(A_{Su}^2 + \sigma_N^2)^{1/2})$$

At the output of the informed reception processing of the type corresponding to the case (I2), the ratio of the amplitude of the tagging signal $C_{tag}$ relative to the amplitude of the useful signal $S_u$ and to that of reception noise, is, after processing $$\text{SINR}'(C_{tag}) = \text{SINR}(C_{tag}) + 10 \cdot \log_{10}(B_{tag} \cdot T_{tag}).$$

Figure 5:
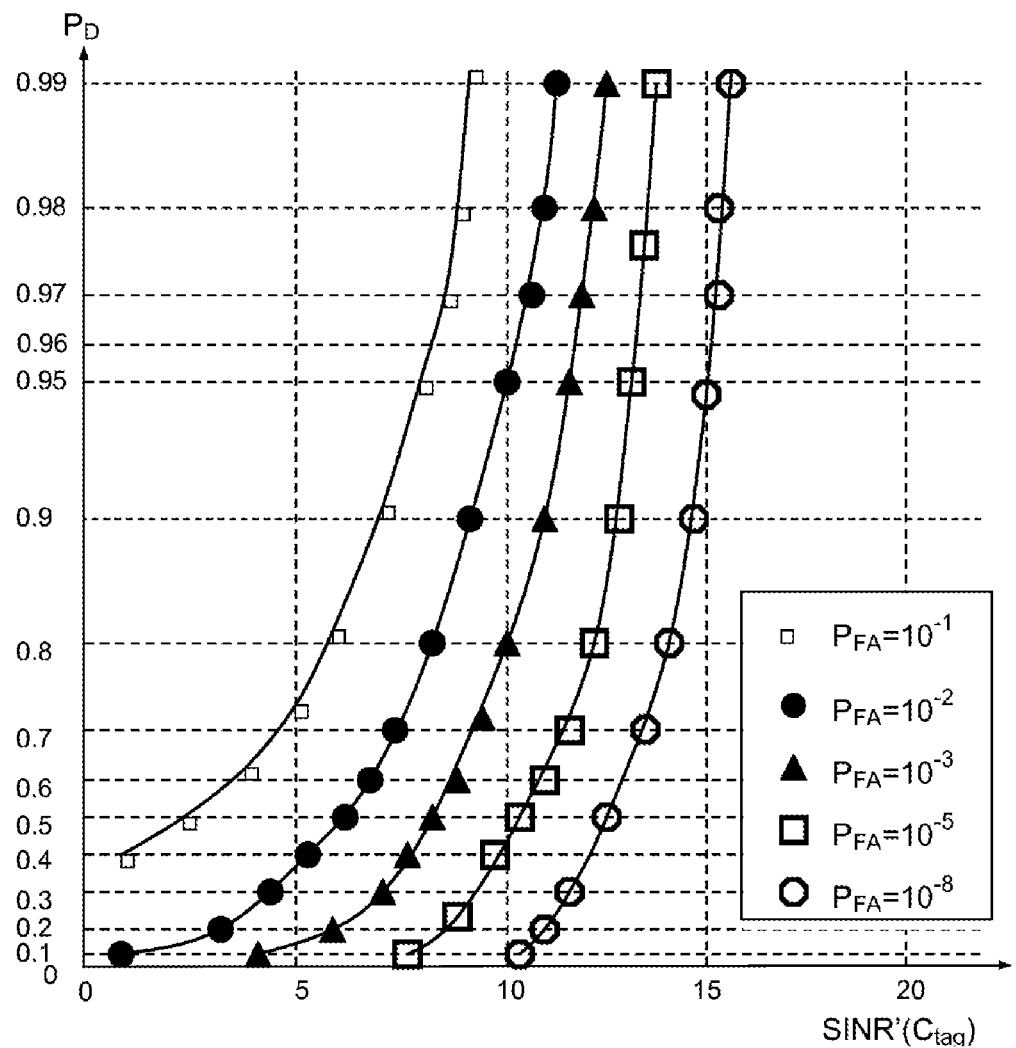

To detect and identify the tag signal $C_{tag}$ unambiguously and with a reduced false alarm rate, the aim in the implementation of the invention will be:

to render, on the one hand, the ratio $\text{SINR}'(C_{tag})$ greater than a certain margin $\eta$, for example a margin $\eta = 10$ dB. In this case, the individual probabilities of detection ($P_D$, $P_{FA}$) will typically be of the order of ($P_D = 0.95$; $P_{FA} = 10^{-2}$) or ($P_D = 0.99$; $P_{FA} = 4.10^{-2}$), etc. (curves of FIG. 5) depending on the thresholdings applied to order a so-called individual detection according to the value of $\text{SINR}'(C_{tag})$, to post-integrate the individual detections performed using a simple logic exploiting the repetition of the individual detections to obtain better Pd'/Pfa' values at the output. For example, with a logic which consists in ordering the detection following four consecutive individual detections (the individual detections being grouped in separate packets of four)

"individual" probabilities ($P_D$, $P_{FA}$) of (0.95; $10^{-2}$) will lead to post-integrated probabilities ($P_D'$, $P_{FA}'$) of the order of (0.8; $10^{-8}$)

"individual" probabilities ($P_D$, $P_{FA}$) of the order of (0.99; $4.10^{-2}$) will lead to post-integrated probabilities ($P_D'$, $P_{FA}'$) of the order of (0.96; $2.610^{-6}$).

Quantified examples will now be given in order to illustrate the implementation of the invention.

EXAMPLE 1

Minimal Implementation

Tagging signal of white noise type or BPSK-modulated PN sequence
Integration period and time $T_{Ctag} = 100 \cdot 10^{-6}$ s, with $B_{Ctag} = B_{Su} = 20$ MHz, hence $10 \cdot \log(B_{tag} T_{tag}) = 23$ dB
At input: $\text{SINR}(C_{tag}) = 20 \cdot \log[A_{Ctag}/(A_{Ctag}^2 + \sigma_N^2)^{1/2}] = -10$ dB
At output: $\text{SINR}'(C_{tag}) = +13$ dB approximately leaving additional 3 dB relative to the usual margin of $\eta = 10$ dB, which makes it possible to offset a slight loss of gain linked to Doppler shifts or local oscillators that are badly compensated or not compensated, without the need for any other rejection or processing. The short integration time of the individual detection makes the latter fairly insensitive to the rapid propagation fluctuations, the post-integration of a significant number of individual detections (typically from 4 to 8) makes it possible, if appropriate, to lower the detection thresholds and tolerate individual false alarm probabilities of the order of $10^{-1}$ (a little higher than the normal), and consequently reinforce the overall sensitivity of the processing without penalizing its reliability or inducing any additional complexity.

EXAMPLE 2

Figure 4:
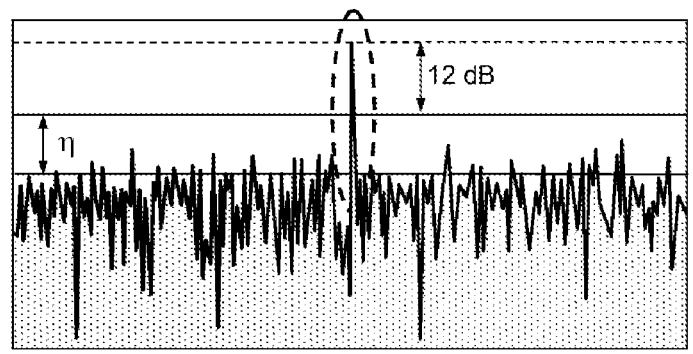
Figure 3:
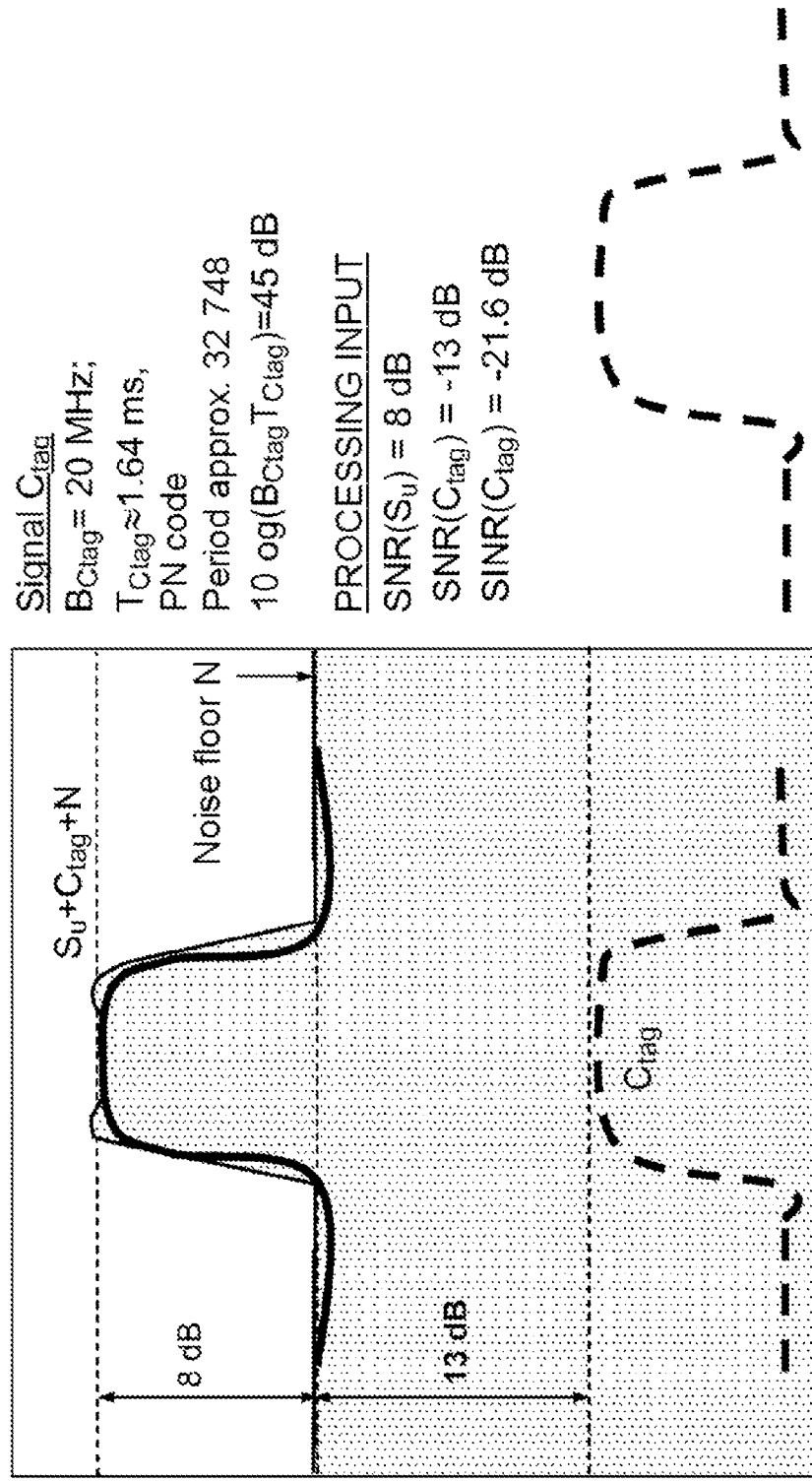

(Nominal Implementation) Corresponding to FIGS. 3 and 4

Tagging signal of BPSK-modulated PN/DSSS type
Integration period and time $T_{Ctag} = 1640 \cdot 10^{-6}$ s, with $B_{Ctag} = B_{Su} = 20$ MHz, hence $10 \cdot \log(B_{tag} T_{tag}) = 45$ dB
At input: $\text{SINR}(C_{tag}) = 20 \cdot \log[A_{Ctag}/(A_{Ctag}^2 + \sigma_N^2)^{1/2}] = -21.6$ dB
At output: $\text{SINR}'(C_{tag})$ 23 dB approximately leaving additional 13 dB relative to the usual margin $\eta = 10$ dB, which makes it possible to offset a significant loss of gain linked to Doppler shifts or local oscillators that are badly compensated or severe propagation fluctuations (fading, maskings) without the need for any other rejection or post-processing (Note: in the implementation produced in FIG. 2, the peak exceeds the upper part of the noise floor by approximately 22 dB).

FIG. 3 gives an example of spectral representation in a processing band equal to the band of the tag signal $B_{Ctag} = 20$ MHz of a mix in reception made up of a useful signal $S_u$ (envelope I) and a tagging signal $C_{tag}$ (curve II) of PN/DSSS type on band B of known sequence of period approximately 32 768 chips. In this example, the tagging signal is 21 dB under the useful signal $S_u$ and 13 dB under the assumed Gaussian white noise floor N (noise power $N = \sigma_N^2$, $\sigma_N$: standard deviation of the distribution of the noise received in the band $B_{Ctag}$ which coincides in this example with the processing band in reception), the ratio $\text{SIR}(C_{tag}) = 20 \cdot \log_{10}(A_{Ctag}/A_{Su})$ is therefore $-21$ dB, the ratio $\text{SNR}(C_{tag}) = 20 \cdot \log_{10}(A_{Ctag}/\sigma_N)$ is therefore $-13$ dB, and the ratio $\text{SINR}(C_{tag}) = 20 \cdot \log_{10}(A_{Ctag}/(A_{Su}^2 + \sigma_N^2)^{1/2})$ is therefore approximately $-21.6$ dB.

FIG. 4 is an exemplary representation of the output of the processing in reception making it possible to detect and recognize (in the form of a peak) the tagging signal $C_{tag}$, with a signal-to-noise+interference ratio at the output greater than a certain margin $\eta$ relative to a noise floor, which is formally written $\text{SINR}'(C_{tag}) > \eta$. In the example of FIG. 4, the usual detection margin relative to the noise floor would be $\eta \sim 10$ dB, but the value of the peak exceeds this margin $\eta$ by approximately 12 dB.

EXAMPLE 3

Extreme Implementation

Tagging signal of BPSK-modulated PN/DSSS type
Integration period and time $T_{Ctag} = 100\,000 \cdot 10^{-6}$ s, with $B_{Ctag} = B_{Su} = 20$ MHz, hence $10 \cdot \log(B_{tag} T_{tag}) = 63$ dB
At input: $\text{SINR}(C_{tag}) = 20 \cdot \log[A_{Ctag}/(A_{Ctag}^2 + \sigma_N^2)^{1/2}] = -50$ dB
At output: $\text{SINR}'(C_{tag}) \geq +13$ dB approximately leaving additional 3 dB relative to the usual margin $\eta = 10$ dB. Given the length of the period and of the integration time $T_{Ctag} = 0.1$ s, the risks of gain losses linked to Doppler shifts, to local oscillators that are badly compensated or to rapid and severe propagation fluctuations during the integration time over $T_{Ctag}$ (fadings, maskings) should be processed by Doppler hypotheses management and by a suitable post-integration as described above.

With additional hypotheses, such as a control of the transmission quality and a sufficient knowledge by the authorized receiver of the dominant useful signal $S_u$, there are enhancing processing operations based on the estimation of the useful signal $S_u$ in the mix in reception and its subtraction from the mix to enhance, upstream, the contrast on the signal $C_{tag}$ before the application of the processing operations described above.

The method and the system according to the invention can therefore notably be used to tag interference signals notably having the function of disturbing the operation of given reception systems. In this case, the useful signal is the interference signal and the tag signal transmitted simultaneously contains information that is useful to the authorized receiver, which leads to a recognition of the transmitter of the interfering signal by the authorized receivers, which, thereby, are not themselves penalized by said interfering signal $S_u$.

The method and the system according to the invention notably offer the following advantages:

the tagging signal is stealthy because it is transmitted at the same time and on the same bands as the useful signal, at a lower level than the latter, the tagging signal is protected against the risks of interception and of analysis by third parties because of the interferences induced "at source" by the useful signal in any reception system employed by these third parties, the tagging signal is recognizable only to authorized and informed third parties, the tagging signal does not require the use of additional frequencies in normal operation, or of a priori specific transmitters. However, it can also employ a secondary transmitter set according to the transmitter of the useful signal, collocated or not with the latter, on the same bands or not, the tagging signal is transmitted at a low power relative to the useful signal, the tagging signal is of very little account in the link budget between the signal transmitted by the authorized user, and it consumes only very little spectral resource relative to the useful signal. Therefore, it does not in any way penalize the capacity of a communications transmitter or of a network of communication transmitters implementing the method according to the invention, the tagging signal induces only very little additional energy consumption.

The invention claimed is:

1. A system for radio frequency tagging a transmitter of a useful first signal $S_u$, by a tagging second signal $C_{tag}$ comprising parameterizable time and frequency characteristics, said tagging second signal is transmitted simultaneously accompanying the useful first signal $S_u$, said transmitter operating in a communication system or network, in a system comprising a number of users authorized and adapted to recognize the tagging second signal through specific processing operations, said system comprising at least the following elements:

the transmitter configured to produce the useful first signal $S_u$ in a given frequency band B, at a frequency $f_{su}$ and an amplitude $A_{su}$, and configured to know at least the values of a band parameter $B_{su}$ of the useful first signal $S_u$ and of the amplitude $A_{su}$ of the useful first signal $S_u$, the transmitter further configured to determine, from said values, parameters of the tagging second signal $C_{tag}$, the parameters comprising:

a carrier of the tagging second signal $C_{tag}$, a band $B_{ctag}$ of the tagging second signal, an amplitude $A_{ctag}$ of the tagging second signal with a signal level X dB lower than the useful first signal $X=A_{ctag}/A_{su}$, and time characteristics of the tagging second signal $C_{tag}$, comprising:

modulation characteristics of the tagging second signal $C_{tag}$, including: a constellation, a rate $R_{ctag}$, a possible filtering in transmission, a duration and a repetition period, $T_{ctag}$, and a description of a construction over the repetition period $T_{ctag}$, a transmission antenna configured to simultaneously transmit said useful first signal $S_u$ and said tagging second signal, the level of said tagging second signal being X dB lower than the useful first signal $S_u$, and a receiver configured to receive and to process the useful first signal and the tagging second signal, and further configured to detect and to discriminate the tagging second signal from the useful first signal.

2. The system as claimed in claim 1, wherein the transmitter comprises:

a first generator configured to produce said useful first signal $S_u$ in the band parameter $B_{su}$, at the frequency $f_{su}$ and the amplitude $A_{su}$, a second generator configured to know at least the values of the band parameter $B_{su}$ of the useful first signal $S_u$ and of the amplitude $A_{su}$ of the useful first signal $S_u$, the second generator further configured to determine, from said values, the parameters of the tagging second signal $C_{tag}$:

the carrier of $C_{tag}$, the band $B_{ctag}$ of $C_{tag}$, the amplitude $A_{ctag}$ of $C_{tag}$, the time characteristics of the tagging second signal including a modulation rate (denoted $R_{ctag}$), a repetition period, denoted $T_{ctag}$, and the description of the construction over the repetition period $T_{ctag}$, and a store/forward system, or a digital exciter, configured to receive the useful first signal $S_u$ and the tagging second signal $C_{tag}$ and adapted to forward said signals by controlling the amplitudes and synchronisms thereof.

3. The system as claimed in claim 1, wherein the useful first signal and the tagging second signal transmitter is configured to:

to produce:

a base band signal, and a resultant signal at an instant t, $S(t)=S_u(t)+(A_{ctag}/A_{su})\cdot A_{ctag}(t)$, said resultant signal S(t) being obtained by an addition of the base band signals $S_u(t)$ and $C_{tag}(t)$ at an output of the two generators, by observing a ratio of the amplitudes $X=A_{su}/A_{ctag}$ by an application of a weighting $X=A_{ctag}/A_{su}$ to the tagging second signal $C_{tag}(t)$, then to transpose onto a carrier $f_0$ and to amplify by a factor $A_{su}$ the signal S(t) resulting from mixing, in order to generate, at the output, an amplified total analog signal on carrier $S_{carrier}(t)=[A_{su}\cdot S_u(t)+(A_{ctag})\cdot C_{tag}(t)]\cdot\cos(2\pi f_0 t)$.

4. The system as claimed in claim 1, comprising a means for preliminary base band storage of the tagging second signal $C_{tag}$ over a repetition period $T_{ctag}$, adapted to allow rereading in authorized receivers for the purposes of their processing operations.

5. The system as claimed in claim 1, wherein the transmitter comprises:

a single digital generator with programmable memory and a single transposition and amplification digital-analog conversion stage, said digital generator is configured to be used sequentially in order to generate the useful first signal $S_u$ then the tagging second signal $C_{tag}$, said digital generator comprising a programmable memory, and said digital generator is configured to:

generate the tagging second signal $C_{tag}(k\cdot T_E)$ and the useful first signal $S_u(k\cdot T_E)$ in base band at a sampling instants $t=k\cdot T_E$ with $T_E$: a sampling period, k: a time index of the sampling period k, by observing a weighting $X=A_{ctag}/A_{su}$ on the sampled tagging second signal $C_{tag}(k\cdot T_E)$, then, generate, in sampled form, a resultant mix $S(k\cdot T_E)=S_u(k\cdot T_E)+(A_{ctag}/A_{su})\cdot C_{tag}(k\cdot T_E)$ in base band at the sampling instants $t=k\cdot T_E$, and said transposition and amplification digital-analog conversion stage is configured to generate a total analog signal on carrier at an output $S_{carrier}(t)=[A_{su}\cdot S_u(t)+(A_{ctag})\cdot C_{tag}(t)]\cdot\cos(2\pi f_0 t)$ using the digital-analog conversion transforming $S(k\cdot T_E)$ into $S(t)$, the transposition onto carrier $f_0$, and the amplification by a factor $A_{su}$.

6. The system as claimed in claim 1, wherein the value of X is between −20 dB and −50 dB.

7. The system as claimed in claim 1, wherein a device for generating the signal $C_{tag}$ comprises a generator configured to generate pseudo-random codes PN, of parameterizable level, period and composition to form the tagging second signal, said composition is obtained by using one of the following methods: totally arbitrary, by simulations or by computations, by shift registers or by combinations between shift registers.

8. The system as claimed in claim 7, comprising a generator of binary sequences chosen from the following list: binary sequences of maximum length, Gold or Gold-type sequences, dual-BCH sequences, simple or extended Kasami sequences, Mac Eliece sequences, Barker codes, or any other type of pseudo-random sequence generated by algebraic methods.

9. The system as claimed in claim 1, wherein the receiver comprises a database comprising characteristics of codes used for generation of the tagging second signal $C_{tag}$.

10. The system as claimed claim 1, wherein the receiver is an informed receiver comprising a database made up of complete characteristics and of a composition of codes used for generation of the tagging second signal $C_{tag}$.

11. A method for radio frequency tagging a transmitter of a useful first signal $S_u$, by a tagging second signal $C_{tag}$ comprising parameterizable time and frequency characteristics, said tagging second signal is transmitted simultaneously accompanying the useful first signal $S_u$, said transmitter operating in a system comprising a number of users authorized and adapted to recognize the tagging second signal, through specific processing operations, comprising at least the following steps:
produce the useful first signal $S_u$ in a given frequency band B, at a frequency $f_{su}$ and an amplitude $A_{su}$,
knowing at least values of a band parameter $B_{su}$ of the useful first signal $S_u$ and of the amplitude $A_{su}$ of the useful first signal $S_u$, determining, from said values, the parameters of the tagging second signal $C_{tag}$:
a carrier of $C_{tag}$,
a band $B_{ctag}$ of $C_{tag}$,
an amplitude $A_{ctag}$ of $C_{tag}$ with a signal level X dB lower than the useful first signal $X=A_{ctag}/A_{su}$,
time characteristics of $C_{tag}$, comprising:
modulation characteristics of the tagging second signal $C_{tag}$, including: a constellation, a rate $R_{ctag}$, a possible filtering in transmission,
a duration and a repetition period, $T_{ctag}$,
a description of a construction over the repetition period $T_{ctag}$ adapted to allow regeneration in authorized receivers for processing operations,
simultaneously transmitting said signal $S_u$ and said tagging second signal, the level of said tagging second signal is X dB lower than the useful first signal $S_u$, and
discriminating, at a signal reception level, the tagging second signal from the useful first signal.

12. The method as claimed in claim 11, wherein distinct transmitters are used to produce the useful first signal $S_u$ and the tagging second signal $C_{tag}$.

13. The method as claimed in claim 11, wherein a resultant signal is generated at an instant t $S(t)=S_u(t)+(A_{ctag}/A_{su})\cdot C_{tag}(t)$ that is transposed onto a carrier $f_0$ and that is amplified by a factor $A_{su}$, to obtain a signal on carrier amplified at an output $S_{carrier}(t)=[A_{su}\cdot S_u(t)+(A_{ctag})\cdot C_{tag}(t)]\cdot\cos(2\pi f_0 t)$, said resultant signal $S(t)$ being obtained by an addition of the base band signals at an output of two analog or digital generators, by observing the amplitudes $A_{su}$ and $A_{ctag}$ by an application of a weighting $X=A_{ctag}/A_{su}$ to the tagging second signal in the resultant signal.

14. The method as claimed in claim 11, wherein a value of X is chosen that is between −20 dB and −50 dB.

15. The method as claimed in claim 11, wherein pseudo-random codes PN are generated, of parameterizable level, period and composition, to form the tagging second signal.

16. The method as claimed in claim 11, wherein characteristics of codes stored in a database are used in order to discriminate, at a signal reception level, the tagging second signal $C_{tag}$ from the useful first signal.

17. The method as claimed in claim 11, characterized in that wherein the following are used:
an informed receiver, comprising a database made up of complete characteristics and of a composition of codes used for generation of the tagging second signal $C_{tag}$,
detection techniques of a type oriented on the characteristics of the signal, based on a use of cyclical self-correlation, an estimation of a first moment being restricted to a range of cyclical frequencies close to a modulation rate of the tagging second signal $C_{tag}$ restricted to ranges of delays close to zero and close to the repetition period T of the tagging second signal $C_{tag}$, an estimation of a second moment being restricted to a range of the cyclical frequencies close to the modulation rate increased by twice the carrier frequency, and
detection techniques of an informed type, based on filtering adapted to the tagging second signal $C_{tag}$.

* * * * *

UNITED STATES PATENT AND TRADEMARK OFFICE
CERTIFICATE OF CORRECTION

PATENT NO. : 9,338,587 B2
APPLICATION NO. : 14/443340
DATED : May 10, 2016
INVENTOR(S) : Francois Delaveau et al.

It is certified that error appears in the above-identified patent and that said Letters Patent is hereby corrected as shown below:

In the claims:

Column 14, line 28 in line 1 of claim 3, please replace "as claimed in claim 1" with --as claimed in claim 2--.

Signed and Sealed this
Fifth Day of July, 2016

Michelle K. Lee
*Director of the United States Patent and Trademark Office*